United States Patent [19]

Bookbinder

[11] 4,390,240

[45] Jun. 28, 1983

[54] WINDOW MIRROR

[76] Inventor: Carl Bookbinder, 330 S. 17th St., Philadelphia, Pa. 19103

[21] Appl. No.: 247,860

[22] Filed: Mar. 26, 1981

[51] Int. Cl.³ .............................................. G02B 5/24
[52] U.S. Cl. ................................... 350/258; 350/267; 350/312
[58] Field of Search .............................. 350/258–265, 350/267, 288, 290, 312; 52/171

[56] References Cited

U.S. PATENT DOCUMENTS

| 893,755 | 7/1908 | Saegmuller . | |
|---|---|---|---|
| 2,373,214 | 4/1945 | Wolkenhaver | 350/267 |
| 2,433,456 | 12/1947 | Jansen | 350/267 |
| 2,441,831 | 5/1948 | Moore | 428/34 |
| 3,001,300 | 9/1961 | Green | 52/171 |
| 3,424,515 | 1/1969 | Risk | 350/258 |
| 3,935,351 | 1/1976 | Franz | 428/34 |
| 3,981,294 | 9/1976 | Deminet | 126/271 |
| 4,093,352 | 6/1978 | Pisar | 52/171 |
| 4,236,360 | 12/1980 | Parrier et al. | 350/312 X |

*Primary Examiner*—Richard A. Wintercorn
*Attorney, Agent, or Firm*—Steele, Gould & Fried

[57] ABSTRACT

A window mirror is disclosed as comprising a frame, at least two transparent panes, and means for holding the panes in a juxtaposed position such that a liquid-tight cavity is defined therebetween. A quantity of mercury is inserted from a reservoir below the cavity, creating a mirror, and removed, leaving a window, from this cavity. In an alternative embodiment the transparent panes have certain portions held in juxtaposed position, while other portions are held in a releasably contacting position, such that when the liquid is inserted between the panes, the panes separate allowing the liquid to fill therebetween.

7 Claims, 5 Drawing Figures

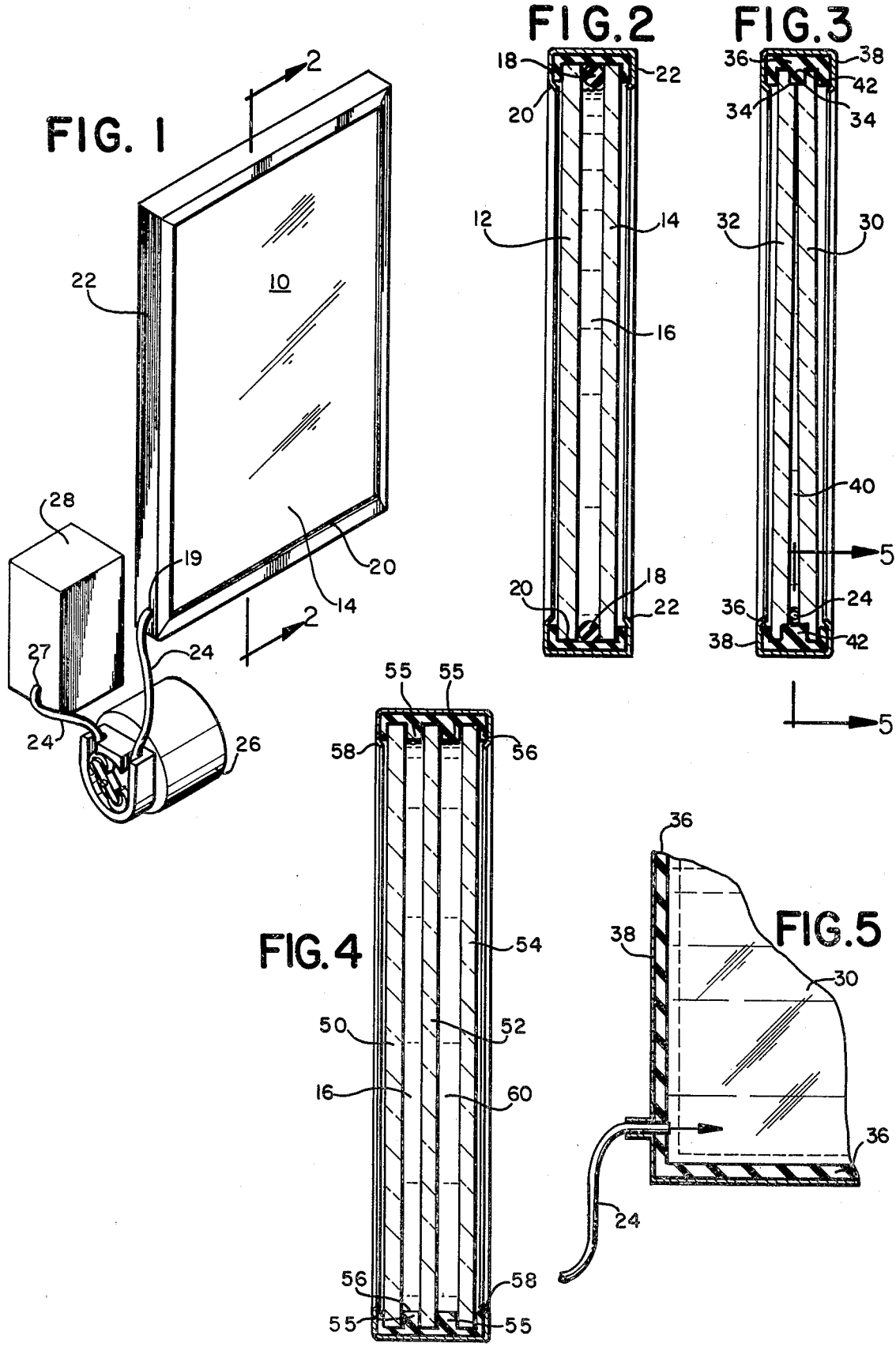

WINDOW MIRROR

BACKGROUND OF THE INVENTION

1. Field of the Invention

This invention relates to the field of windows having at least two panes of transparent material disposed therein, between which a fluid is inserted.

2. Prior Art

In the past, there have been disclosed reflective devices utilizing a transparent pane. U.S. Pat. No. 893,775—Saegmuller discloses a mirror for optical instruments, wherein a silvering material is applied to the back surface of a transparent plate. The back surface of a silvering material is polished and then covered by a second plate which may or may not be transparent. The silvering material cannot be removed unless this device is disassembled. U.S. Pat. No. 3,935,351—Franz discloses a multiple glazed glass article wherein one of the glass panels utilized is provided with two coatings, one being a metal and the other including a metal oxide. According to the inventor, the device provides useful and asthetic reflective and transmission properties. Again, the reflective material cannot be removed from the device without disassembling it. Again, in U.S. Pat. No. 3,999,345 there is disclosed an insulated building element comprising inner and outer spaced parallel sheets or plates of glass in which a thin film of reflective metal is applied to inner surface of the outer glass sheet. While it is disclosed therein that this reflective metal may be applied by the sputter-coating process, it may not be removed from the outer glass sheet without disassembling the device.

There has also been described in the past several items wherein at least two transparent panes have been held in juxtaposed position for the insertion of a liquid or vapor in the cavity therebetween. U.S. Pat. No. 2,441,831—Moore discloses a transparent double glazing unit having a chamber between the transparent panels into which is placed a transparent, electrically conductive medium consisting of a liquid into which an electrolyte has been dissolved. The function and purpose of this liquid is to heat the glass sheets substantially uniformly, thereby preventing clouding, frosting or icing thereof. U.S. Pat. No. 3,001,300—Green discloses a double glazed window which is capable of blocking vision on a percentage basis. There is a reservoir located between outer and inner transparent members into which a vapor is inserted. This vapor may comprise only air, in which case the device would be substantially transparent, or may consist of a colored fluid, the concentration of which is related to the percent of visibility.

There have also been disclosed devices which pass a liquid between substantially transparent panes such as U.S. Pat. No. 3,981,294—Deminet, et al. That reference discloses a glass composite building panel which is constructed of three layers of glass separated by integral raised walls which define either vacuum cells or a serpentine passageway for liquid flow therethrough. The primary purpose of this reference is as a solar heat collector. The cavities contained in that device are either empty or filled with a fluid, and it would not be possible to utilize this device if the passageways which contained the heat absorbing fluid were only partially full. It is briefly stated that panel can be used in essence as an integral shade if an opaque, metallic or colored liquid is pumped therethrough. U.S. Pat. No. 4,093,352 discloses a window having face-to-face panes defining a cavity therebetween which is adapted to be selectively flooded with a colored liquid. The window thereby is characterized by the provision of a supply manifold located between the panes.

None of the above-cited references disclose a window comprising a frame, at least two transparent panes, means for holding the panes in a juxtaposed position, defining a fluid-tight cavity therebetween, fluid having substantially the same reflective index as mercury, and means for inserting and removing the fluid to and from the cavity. Similarily, none of these references shows a plurally glazed window wherein at least two of the transparent members have portions held in juxtaposed position while the other portions of the transparent members are releasably contacting each other.

SUMMARY OF THE INVENTION

It is an object of the present invention to provide a window which is selectively capable of acting as a mirror.

It is a further object of the present invention to provide a window which is capable of reflecting the sun's energy.

It is another object of the present invention to provide a window which is capable of collecting energy from sunlight.

It is yet another object of the present invention to provide a window which has a selectively operable shade disposed therein.

These and other objects are accomplished in accordance with the principals of this invention by utilizing a frame, at least two transparent panels, providing means for holding the panels in juxtaposed position, defining a fluid-type cavity therebetween, a fluid having substantially the same reflective index as mercury and providing means for inserting and removing the fluid to and from the cavity. The two transparent panes can also be used in accordance with the principals of the present invention if a portion of each is held in juxtaposed position and the other portions remain in releasable contact with each other, such that when the fluid is inserted therebetween, the panes separate slightly.

BRIEF DESCRIPTION OF THE DRAWINGS

For the purposes of illustrating the invention, there are shown in the drawings forms which are presently preferred; it being understood, however, that this invention is not limited to the precise arrangements and instrumentalities shown.

FIG. 1 is perspective view of the present invention;

FIG. 2 is a section view along the line 2—2 of FIG. 1;

FIG. 3 is an alternative embodiment of the present invention shown in a section-view along an identical line 2—2 as shown in FIG. 1;

FIG. 4 is an alternative embodiment of the present invention shown in a section-view along an identical line 2—2 shown in FIG. 1; and, FIG. 5 is a section-view along the line 5—5 of FIG. 3.

DETAILED DESCRIPTION OF THE PREFERRED EMBODIMENT

A window, which is selectively capable of acting as a mirror, a window, or a shade, is depicted in FIG. 1 and generally referred to as 10.

The window of the preferred embodiment is seen in FIG. 2 to comprise two substantially parallel transparent panes 12 and 14 held in juxtaposed position by O-ring 18. O-ring 18 not only serves to maintain the juxtaposed position of the panes but also serves to maintain the space defined therebetween in a liquid-tight condition. This chamber also can maintain a vacuum when liquid is not present therein.

Sealing ring 20, which is preferably formed of rubber or an elastomeric composition, such as neoprene, is attached around the circumference of the panes in a fashion to further ensure the fluid-tight cavity between the panes or the maintenance of a vacuum therebetween. Frame 22 serves to hold sealing ring 20, O-ring 18 and panes 12 and 14 securely against one another to further ensure the maintenance of a liquid-tight cavity between the panes or a vacuum therein.

As shown in FIG. 2, fluid 16 has been inserted into the cavity between panes 12 and 14. Fluid 16 is preferred to have a reflective index equal to or greater than the element mercury or to have a similar reflective capacity. If mercury is to be utilized in the instant invention, precautions taken to ensure the non-leakage of the liquid or any vapors therefrom through any member of the instant invention become more important because of the toxic effects of that element.

The means for inserting and removing fluid 16 from the cavity between panes 12 and 14 is shown in FIG. 1 as comprising reservoir 28, hose 24 and peristaltic pump 26. Although a peristaltic pump is utilized in the preferred embodiment, the use of other forms of pumps is envisioned. However, if a vacuum is to be maintained, as in the preferred embodiment, only those pumps which can function in a closed system can be utilized. Since it is preferred to maintain a vacuum both in the cavity defined by panes 12 and 14 and in reservoir 28, hose 24 is securely attached at points 19 and 27 in a fashion to maintain such vacuum. A liquid-tight attachment of hose 24 is also preferred. The liquid-tight attachment of hose 24 would be especially important if the element mercury is used as fluid 16. As shown in FIG. 1, hose 24 is connected to the bottom of window 10 allowing gravity to assist in the removal of fluid 16. If a vacuum is not to be maintained in the cavity, an alternative means for inserting and removing fluid 16 could be based upon the siphoning effect. In that situation, reservoir 28 would be raised and lowered allowing the level of fluid 16 to rise or retract to a level equal to that of reservoir 28. Use of this insertion and removal means is of course dependant upon the size of the reservoir and weight of fluid 16 contained therein.

An alternative embodiment of the present invention is shown in FIG. 3. Window 10 is substantially the same as the preferred embodiment except that the means for holding the panes in juxtaposed position holds a portion of the panes in that position, while other portions of the pane are held in a releasably contacting condition. As fluid is inserted into cavity 40 between the panes, the panes are separated thereby.

Panes 32 and 30 are channeled around their circumference at 34. Panes 32 and 30 are held in the above-described position primarily by sealing ring 36. Ring 36 is a rubber or elastomeric substance, such as neoprene, which is fitted securely in the channeled area 34 and provides a liquid tight seal to the cavity contained between panes 32 and 30. As can be seen in FIG. 3, panes 32 and 30 are held in the above-described position by center portion 42. Center 42 is wider along the bottom of panes 32 and 30 than at the top. Center portion 42 is tapered along the sides of window 10, (not shown in the drawings) from the bottom to the top of window 10. The liquid-tight seal and vacuum maintaining capacity is assured by surrounding seal 36 with frame 38. Since seal 36 is made from rubber or an elastomeric material, panes 32 and 30 may move towards and away from each other within frame 38 without jeopardizing the liquid-tight cavity or vacuum.

FIG. 5 shows the insertion of hose 24 in the alternative embodiment of window 10 at a point where panes 30 and 32 are held in juxtaposed position. Similar to the preferred embodiment, hose 24 is securely attached in a fashion which maintains the cavity defined between panes 32 and 30 in a liquid-tight or vacuum condition. As fluid 16 is inserted into the cavity between panes 30 and 32 separation causes a capillary effect, aiding the insertion of fluid 16.

FIG. 4 shows an additional alternative embodiment of the present invention, wherein three transparent panes, 50, 52 and 54, are held in juxtaposed position defining two liquid-tight cavities therebetween. In this embodiment, fluid 16, is inserted between panes 50 and 52. A colored or translucent fluid 60 is inserted between panes 52 and 54. The insertion of each of these fluids is done through separate reservoir and pump combinations, not shown in the drawings. For example, if fluid 60 were inserted into the cavity between panes 52 and 54 and the cavity between panes 50 and 52 were maintained in a vacuum, window 10 would serve as a filter or to diffuse the light passing through the fluid. Alternatively, window 10 of this embodiment could act as the mirror window in the preferred embodiment. If both cavities were to be filled concurrently, the window could serve to either filter the color reflections of the mirror, or fluid 60 could act to collect the energy from the sun and the energy reflected from the mirrored portion of the window.

In the embodiment shown in FIG. 5, panes 50, 52 and 54 are held in juxtaposed position by ridges 55 of sealing ring 56. Ring 56 is disposed around the circumference of panes 50, 52 and 54 and maintains the cavities defined therebetween in either liquid-tight or vacuum condition. Frame 58 assures the liquid-tight or vacuum contact between sealing ring 56 and panes 50, 52 and 54. The means for inserting fluid into the cavities of this embodiment are preferably identical to those hereinbefore described.

In a further embodiment of the present invention, fluid 16, rather than having substantially the same reflective index as mercury, would rather have translucent properties, such that light would pass diffused therethrough. It would not be possible to clearly distinguish figures or objects on either side of the window. An example of this kind of fluid is sodium silicate mixed with water. Utilizing this embodiment, window 10 would provide either light and privacy or serve as a clear window.

The present invention may be embodied in other specific forms without the departing from the spirit or essential attributes thereof, and, accordingly, reference should be made to the appended Claims, rather than the foregoing Specifications as indicating the scope of the invention.

I claim:

1. A window controllably operable as a light transmitting window and as a mirror, the window comprising:

at least two substantially rigid flat panes, the panes being at least partly light transmissive;

a spacer disposed between the panes, the spacer and panes defining a vacuum-tight cavity;

a reservoir disposed below the cavity and in liquid communication with a lower part of the vacuum-tight cavity, whereby a liquid placed in the cavity will be drawn by gravity toward the reservoir;

a charge of mercury to be controllably moved between the reservoir and the cavity, a vacuum remaining in the cavity when the mercury is moved to the reservoir, whereby the window is made light transmitting; and, a pump for moving the mercury from the reservoir to the cavity, whereby the window is made reflective.

2. The window of claim 1, wherein the spacer holds the rigid flat panes apart along one edge thereof, whereby the panes are moved apart by the pumped mercury being moved into the cavity.

3. The window of claims 1 or 2, wherein the spacer is resilient, the panes moving towards one another as the mercury is moved to the reservoir.

4. The window of claim 1 or 2, wherein said reservoir is connected to said cavity by a hose, the pump being a peristaltic pump.

5. The window of claim 1, wherein said means for holding said panes in a juxtaposed position comprises an O-ring inserted between said panes.

6. The window of claim 5, further comprising a sealing ring securely attached to the circumference of said panes.

7. The window of claim 6, wherein said O-ring and said sealing ring are formed from neoprene.

* * * * *